(12) United States Patent
Lu

(10) Patent No.: US 9,976,304 B2
(45) Date of Patent: May 22, 2018

(54) COMPOSITE MATERIAL BASED PANEL

(71) Applicant: City University of Hong Kong, Kowloon (HK)

(72) Inventor: Yang Lu, TKO (HK)

(73) Assignee: City University of Hong Kong, Hong Kong (HK)

(*) Notice: Subject to any disclaimer, the term of this patent is extended or adjusted under 35 U.S.C. 154(b) by 0 days. days.

(21) Appl. No.: 14/881,381

(22) Filed: Oct. 13, 2015

(65) Prior Publication Data

US 2017/0101781 A1    Apr. 13, 2017

(51) Int. Cl.
| | |
|---|---|
| *E04B 2/00* | (2006.01) |
| *B29C 43/20* | (2006.01) |
| *B29C 43/40* | (2006.01) |
| *B29C 43/52* | (2006.01) |
| *B32B 27/30* | (2006.01) |
| *C08L 27/06* | (2006.01) |
| *E04C 2/16* | (2006.01) |
| *E04C 2/22* | (2006.01) |
| *E04C 2/28* | (2006.01) |
| *E04C 2/38* | (2006.01) |
| *E04F 13/08* | (2006.01) |

(Continued)

(52) U.S. Cl.
CPC .............. *E04C 2/46* (2013.01); *B29C 43/203* (2013.01); *B29C 43/40* (2013.01); *B29C 43/52* (2013.01); *B32B 27/304* (2013.01); *C08L 27/06* (2013.01); *E04C 2/16* (2013.01); *E04C 2/22* (2013.01); *E04C 2/28* (2013.01); *E04C 2/38* (2013.01); *E04F 13/0894* (2013.01); *E04F 13/16* (2013.01); *B29K 2027/06* (2013.01); *B29K 2201/00* (2013.01); *B29L 2009/00* (2013.01); *B32B 2260/021* (2013.01); *B32B 2260/046* (2013.01); *B32B 2262/065* (2013.01); *B32B 2419/04* (2013.01)

(58) Field of Classification Search
CPC ...................................................... B29C 43/203
See application file for complete search history.

(56) References Cited

U.S. PATENT DOCUMENTS

| | | | | |
|---|---|---|---|---|
| 4,255,477 A | * | 3/1981 | Holman | ............ B27N 3/04 428/106 |
| 5,543,197 A | * | 8/1996 | Plaehn | ............ B27N 3/04 144/333 |

(Continued)

FOREIGN PATENT DOCUMENTS

| | | | | |
|---|---|---|---|---|
| AU | 2011213905 A1 | * | 3/2012 | |
| KR | 101150955 B1 | * | 5/2012 | |
| NL | WO 2010014005 A1 | * | 2/2010 | ...... B27N 1/00 |

OTHER PUBLICATIONS http://www.bodabambooflooring.com, Retrieved on Dec. 31, 2015, pp. 1-2.

(Continued)

*Primary Examiner* — Babajide Demuren
(74) *Attorney, Agent, or Firm* — Renner Kenner Greive Bobak Taylor & Weber

(57) ABSTRACT

A composite material panel includes a substrate formed of a first material; one or more strands formed from a second material, the strands being interspersed through the substrate, the second material being a natural material, the second material providing modified mechanical properties of the composite material panel.

20 Claims, 9 Drawing Sheets

(51) Int. Cl.
*E04F 13/16* (2006.01)
*B29K 27/06* (2006.01)
*B29K 201/00* (2006.01)
*B29L 9/00* (2006.01)

(56) References Cited

U.S. PATENT DOCUMENTS

| | | | | |
|---|---|---|---|---|
| 6,722,093 | B2* | 4/2004 | Dauplay | B32B 9/02 |
| | | | | 52/313 |
| 7,152,379 | B2* | 12/2006 | Lin | B32B 3/10 |
| | | | | 52/391 |
| 7,185,460 | B2 | 3/2007 | Corden | |
| 7,836,655 | B2* | 11/2010 | Chen | B27M 3/0053 |
| | | | | 428/106 |
| 2007/0048541 | A1* | 3/2007 | Ou | B32B 3/16 |
| | | | | 428/537.1 |
| 2007/0077445 | A1* | 4/2007 | Lawson | A01N 59/14 |
| | | | | 428/537.1 |
| 2008/0216435 | A1* | 9/2008 | Nolan | E04F 13/08 |
| | | | | 52/588.1 |
| 2009/0087656 | A1* | 4/2009 | Plaehn | B29C 44/12 |
| | | | | 428/378 |
| 2009/0263617 | A1* | 10/2009 | Ou | B27N 3/002 |
| | | | | 428/106 |
| 2010/0028617 | A1* | 2/2010 | Plaehn | E04C 2/18 |
| | | | | 428/182 |
| 2010/0178451 | A1* | 7/2010 | Li | B27J 1/00 |
| | | | | 428/106 |
| 2010/0247861 | A1* | 9/2010 | Mitchell | B32B 9/02 |
| | | | | 428/142 |
| 2011/0027529 | A1* | 2/2011 | Zhang | B27N 3/04 |
| | | | | 428/137 |
| 2012/0015131 | A1* | 1/2012 | Akarsu | B27M 3/006 |
| | | | | 428/54 |
| 2013/0108857 | A1* | 5/2013 | Zhang | B27N 3/04 |
| | | | | 428/292.4 |
| 2014/0062126 | A1* | 3/2014 | Weinberg | B29C 70/465 |
| | | | | 296/180.4 |
| 2014/0147642 | A1* | 5/2014 | Weinberg | B29C 70/465 |
| | | | | 428/212 |

OTHER PUBLICATIONS http://bambooindustry.com, Bothbest Bamboo Flooring, Retrieved on Dec. 31, 2015, pp. 1-3.
Carlos, et al. "Modeling bamboo as a functionally graded material: lessons for the analysis of affordable materials" J. Mater. Sci. 41, pp. 6991-7004(2006).
Chakraborty, et al. "Processing of the uni-directional powdered phenolic resin bamboo fiber composites and resulting dynamic mechanical properties" Journal of Reinforced Plastics and Composites, vol. 28, No. 11, pp. 1339-1348 (2009).
Huda, et al. "Ultra-light-weight composites from bamboo strips and polypropylene web with exceptional flexural properties" Composites: Part B, Engineering, vol. 43, pp. 1658-1664 (2012).
Gibson, L.J. "The hierarchical structure and mechanics of plant materials" J.R. Soc. Interface, pp. 1-18 (2012).
Nirmal, et al. "Adhesive wear and frictional performance of bamboo fibres reinforced epoxy composite" Tribology International, vol. 47, pp. 122-133 (2012).
Slamet, N.I., "Examining the potential of strand woven bamboo as an alternative to wood construction material in Japan" Master's Thesis, Ritsumeikan Asia Pacific University, pp. 1-118 (Mar. 2012).
Vogtlander, et al. "The sustainability of bamboo products for local and Western European applications. LCAs and land-use" J. Cleaner Production, vol. 18, pp. 1260-1269 (2010).
Wong, et al. "Fracture characterization of short bamboo fibre reinforced polyester composites" Materials & Design vol. 31, pp. 4147-4154 (2010).

* cited by examiner

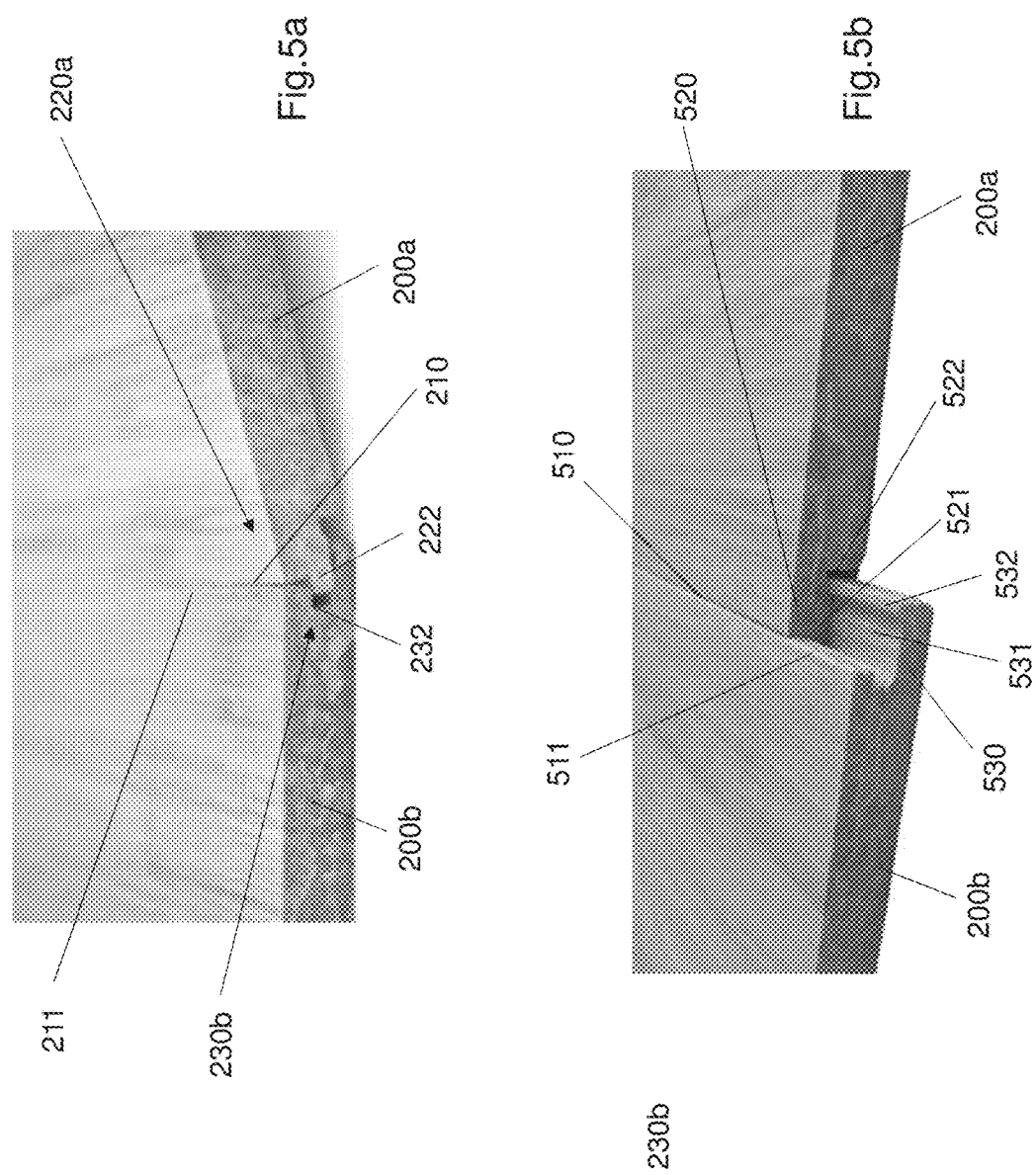

COMPOSITE MATERIAL BASED PANEL

TECHNICAL FIELD

The present disclosure relates to a novel composite material based panel, and particularly, although not exclusively, to a composite panel which can be used in wall systems and method of manufacturing a green composite (or "eco-composite") material based panel that may be useful in the construction industry. However, it will be appreciated that the composite-based panels of the present disclosure is not limited to this particular field of use.

BACKGROUND

In recent decades the use of natural materials has become more extensive and prevalent in various industries. The use of natural materials has become more prevalent especially in the construction industry for use in furniture, decoration, wall paper, insulation and other such products in the construction industry.

Wall panels are often used in the construction industry, in particular within the interior design and decoration industries. Traditional wall panel products are mainly made from plastics, polymer composites, fibre cement, wood and metals/metal alloys. Most traditional wall panel products are often not environmentally friendly or ecologically friendly.

SUMMARY OF THE PRESENT INVENTION

In accordance with a first aspect, the present disclosure relates to a composite material panel comprising:
a substrate formed of a first material
one or more strands formed from a second material, the strands being interspersed through the substrate, the second material being a natural material,
the second material providing modified mechanical properties of the composite material panel.

In an embodiment the second material is a natural material.

In an embodiment the strands are interspersed through the substrate and held within the substrate.

In an embodiment, the strands are bamboo strands.

In an embodiment, the second material provides optimized mechanical properties of the composite material panel.

In an embodiment the strands have a rectangular cross section and the strands are a rectangular prism shape.

In an embodiment each strand a plurality of fibres, the fibres being arranged longitudinally along the length of the strand.

In an embodiment the strands are arranged parallel to each other within the substrate and wherein the strands are equally spaced apart from each other within the substrate.

In an embodiment the strands are arranged parallel to the longitudinal axis of the panel.

In an embodiment the strands are arranged in a random distribution within the substrate.

In an embodiment two or more strands are joined together to form a strand bundle and wherein the panel comprises a plurality of strand bundles interspersed through the substrate.

In an embodiment the natural material is bamboo, and the strands are bamboo strands.

In an embodiment the strands comprise up to 70% of the bulk volume of the composite material panel.

In an embodiment the composite material panel comprises an outer layer arranged to encase the substrate and strands, the outer layer being formed of a third material, and wherein the third material is a thermoplastic polymer material.

In an embodiment the third material is polyvinylchloride (PVC).

In an embodiment the composite material panel is substantially rectangular in cross section, and is a rectangular prism in shape.

In an embodiment the composite material panel comprises a first and second longitudinal edge, the first and second longitudinal edges being parallel to each other, the panel comprising a first coupling arrangement positioned on the first longitudinal edge and a second coupling arrangement positioned on the second longitudinal edge.

In an embodiment the first and second coupling arrangements are one half of a mechanical joint, the first and second coupling arrangements being shaped and configured to interface with a corresponding coupling arrangement of a second panel to join the composite material panel to another panel.

In an embodiment the first coupling arrangement is a male portion of the mechanical joint and the second coupling arrangement is a female portion of a mechanical joint, the first coupling arrangement configured to mate with a corresponding female portion of a mechanical joint and the second coupling arrangement configured to receive a corresponding male portion of a mechanical joint and wherein the mechanical joint.

In an embodiment the mechanical joint is a tongue and groove joint or a grooved joint.

In an embodiment the composite material panel comprises a density of at least 1100 kg/m$^3$, a hardness of at least 2800 lbf and an elastic modulus of at least 22 GPa.

In a second aspect, the present disclosure relates to a wall system comprising:
a first panel, a second panel,
the first and second panels arranged to removably couple to each other such that the wall system is a modular arrangement,
and wherein each panel comprises a substrate formed of a first material and a plurality of elongate strands of a natural material being interspersed through the substrate.

In an embodiment the first panel comprises a coupling arrangement on a longitudinal edge, the second panel comprises a coupling arrangement on a longitudinal edge, the coupling arrangement on each of the first panel and second panel being complementary to each other such that the first panel can be removably coupled to the second panel.

In an embodiment the first panel and second panel are a composite material panel as per any one or the embodiments of the first aspect.

In a third aspect, the present disclosure relates to a method of manufacturing a composite material panel that can be used as part of a modular wall system, the method comprising the steps of;
provide a first material into a mould, the first material being a polymer material, the polymer material forming substrate,
provide a plurality of strands of a natural material into the mould,
applying heat and pressure to the mould such that the natural material strands are interspersed within the polymer material to create a composite structure.

In an embodiment applying heat causes the polymer material to melt and spread through the strands and wherein the method comprises the additional step of cooling the composite structure such that the polymer material sets to retain the strands within the substrate.

In an embodiment the natural material is bamboo and the method comprises cutting the natural material strands from a bamboo culm.

In an embodiment the method comprises the additional step of applying a third material to form an outer layer, the outer layer encasing the composite structure, the third material being applied via an overmoulding operation and wherein the outer layer being polyvinylchloride.

In an embodiment the method comprises the additional step of cutting the cooled composite structure into a rectangular prism shaped panel, and wherein 0.3-1 MPa of pressure is applied and the heat applied is between a range of 350 degrees Celsius to 400 degrees Celsius.

In connection with dimensions, the term approximately should be understood to mean within standard manufacturing tolerances or deviations that result and/or can be expected during manufacturing. In addition, the term approximately can extend up to and including dimensions that would round to the stated value.

The terms "generally" or "substantially" should be understood to mean "for the most part." For example, a component that is generally cylindrical need not necessarily conform to a perfect cylinder (a surface or solid bounded by two parallel planes and generated by a straight line moving parallel to the given planes and tracing a curve bounded by the planes and lying in a plane perpendicular or oblique to the given planes). Rather, a generally cylindrical component should be understood to be cylinder-like in that it has a circular profile along a cross-section and an elongate longitudinal profile.

The term "comprising" (and its grammatical variations) as used herein are used in the inclusive sense of "having" or "including" and not in the sense of "consisting only of".

BRIEF DESCRIPTION OF THE DRAWINGS

FIG. 5a shows an embodiment of a coupling between two panels and shows an embodiment of a first and second coupling arrangement.

FIG. 5b shows an alternative embodiment of a coupling between two panels and shows an alternative embodiment of a first and second coupling arrangement.

DETAILED DESCRIPTION OF THE PREFERRED EMBODIMENT

The use of natural materials is particularly prevalent in the construction industry. For example as building consultants, contractors and customers are more ecologically conscious and the demand for products made from materials that reflect more ecologically conscious and environmentally friendly (i.e. "green") values, are in greater demand. Natural materials are often used in interior decoration such as sculptures or feature walls. Natural materials are also commonly used in the construction of furniture.

The foregoing describes only some embodiment of the present invention and modifications, obvious to those skilled in the art, can be made thereto without departing from the scope of the present invention.

In an embodiment the present disclosure is directed to a composite material panel or a composite material based panel that is made at least partly from natural materials to represent an ecologically conscious product, or at least provide the public with a useful alternative. The composite material panel of the present disclosure is suitable for use as structural elements, in particular the composite material panel is suitable for use as wall panels. These wall panels can be used as interior wall panels as part of a wall system that can be used within interiors such as within office buildings and shopping malls.

Figure 1:
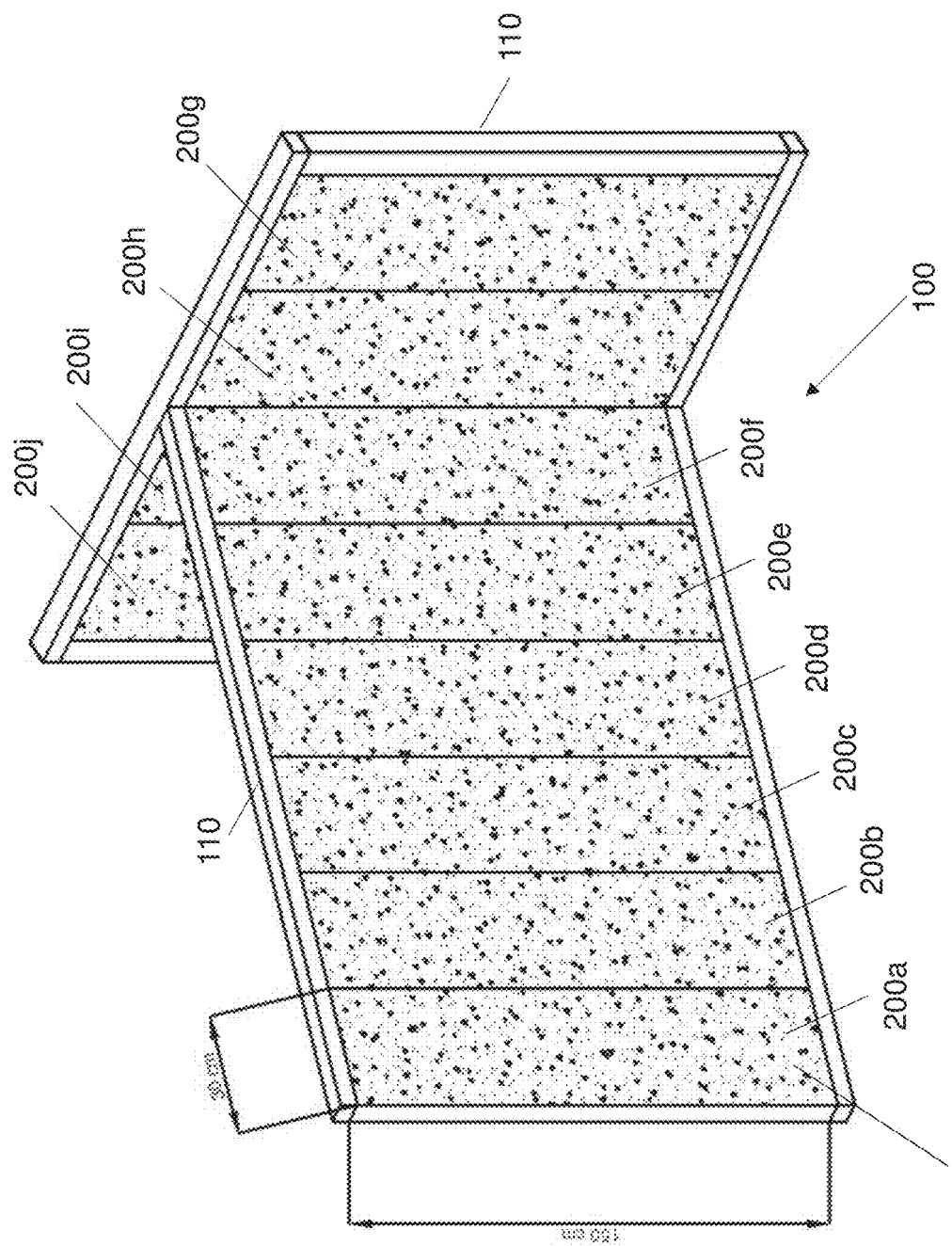
FIG. 1 shows an embodiment of a wall system comprising a plurality of composite material panels.

In an embodiment the composite material panel comprises a substrate formed from a first material, one or more strands FIG. 1 shows an embodiment of a wall panel system 100. The wall panel system 100 comprises a plurality of composite material panels 200. The plurality of composite material panels 200 are removably connected to each other to allow for a modular wall panel system. The illustrated embodiment shows ten composite material panels labelled 200a to 200j. The wall panel system 100 can comprise one or more composite material panels 200.

The panels 200 each comprise a coupling arrangement that allows the panels 200 to be removably connected to each other. The coupling arrangement can be any suitable mechanical arrangement such as a dovetail joint, a tongue and groove joint or any other suitable joint. The coupling arrangement will be described in further detail with respect to FIG. 5.

In the illustrated example each panel 200 is approximately 1.5 m tall, 0.3 wide and 0.02 m thick. The panel 200 can be formed into any other suitable or desired sizes. The illustrated wall panel system 100 is used to create internal office wall panels or partitioning system in an office or in any other building. One main use of the wall panel system 100 is for internal constructions and wall panel arrangements that can be used in office buildings, classrooms, shopping malls or any other such building structures. The modular wall panel system 100 is lightweight, has high strength, high bending/buckling resistance and durable. Each composite panel 200 can be removably connected to other panels, which provides the wall panel system 100 its modularity. The wall panel system 100 is advantageous because the system 100 can be shaped into any suitable shape by connecting multiple panels 200 together. The wall system 100 can comprise an outer edging 110 that is attached to the assembled panels 200. The edging can be formed of multiple pieces and be modular. The edging can also be configured to allow connection of multiple edging pieces together to form a desired shaped wall system 100. The edging in one example can be made of aluminum but other materials are contemplated. The edging 110 provides some structure for the wall panel system 100.

Figure 2:
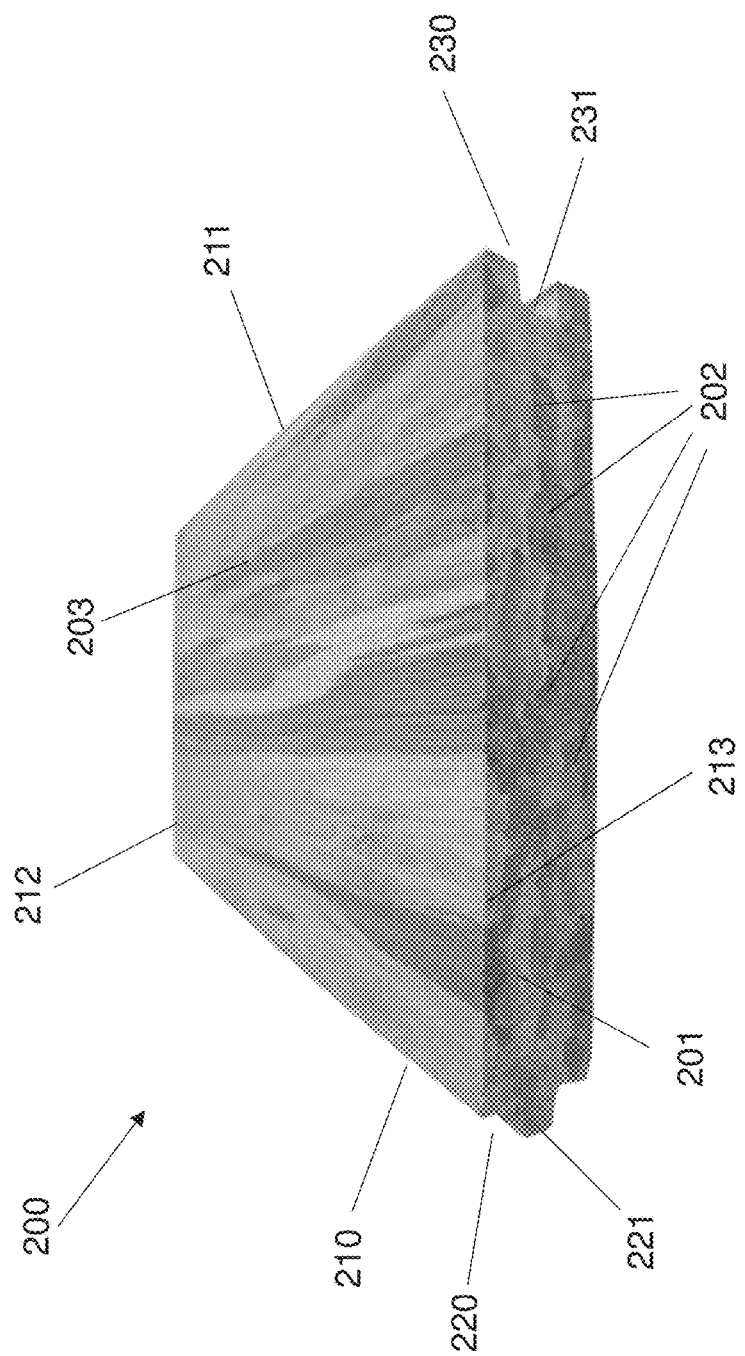
FIG. 2 shows an embodiment of the composite material panel, in particular the structure of the panel.

The composite material panel 200 will be described in more detail. FIG. 2 shows an embodiment of the composite material panel 200. The composite material wall panel 200 comprises a substrate 201 formed of a first material, one or more strands 202 of a second material interspersed through the substrate 201 and an encasing layer 203 forming the outer layer of the panel 200. In the illustrated embodiment the first material is a thermoplastic polymer material such as polyethylene or polypropylene, for example without limitation. In other alternative embodiments other thermoplastics are also contemplated. The first material is a material that can be moulded or a material that can be transformed between states under heat and/or pressure, such as for example a thermoplastic or a thermoset polymer material. The first material is a polymer material that is pliable and mouldable above a particular temperature and then solidifies upon cooling.

The second material that forms the strands 202 is a natural material. Natural material as used herein covers organic materials that occur in nature. In the illustrated embodiment the natural material is a plant based material that occurs in nature. Preferably the natural material is bamboo. Other timber material or plant material such as flax, grasses, and straw can also be used to form the strands 202 in alternative embodiments. Bamboo or other grasses are found to be most suitable for use in creating the composite material panel 200.

In the illustrated embodiment the strands 202 are formed from bamboo. The strands 202 are elongate in shape and are longer than they are wide. The strands 202 are also flexible along the longitudinal axis of the strands 202. The strands 202 are cut from bamboo branches, and more specifically by cutting the culm of bamboo. The strand 202 is cut along the culm thickness of the bamboo branch. The strands 202 are arranged and interspersed through the substrate 201. The strands 202 are arranged lengthwise within the substrate 201. In the illustrated embodiment the strands 202 are randomly distributed within the substrate 201. In alternative embodiments the strands 202 may be arranged parallel to each other and may be equally spaced from each other 202.

The outer layer or encasing layer comprises a polymer material. In the illustrated embodiment the outer layer 203 or encasing layer is polyvinylchloride (PVC). The structure of the composite material panel 200 will be described in more detail with reference to FIG. 3a and FIG. 3b.

Referring back to FIG. 2, the panel 200 is generally rectangular in cross section. The panel 200 is generally rectangular prism in shape. In alternative embodiments the panel 200 can be any other suitable shape in cross section for example generally, trapezoid, parallelogram or square or any other planar shape. A planar shape is a shape that has generally straight edges as compared to curved edges. A planar shaped cross section e.g. rectangle or square is more desirable if the panel is going to be used in a modular wall system. The panel 200 can be cut into an appropriate shape once the panel is formed.

The composite material panel 200 comprises a first longitudinal edge 210 and a second longitudinal edge 211. The first and second longitudinal edges 210, 211 are substantially parallel to each other. The panel 200 further comprises a first transverse edge 212 and second transverse edge 213. The first and second transverse edges 212, 213 are substantially parallel to each other.

As per FIG. 2, the panel 200 comprises a first coupling arrangement 220 and a second coupling arrangement 230. The first coupling arrangement 220 is positioned along the first longitudinal edge 210 and extends along the length of the first longitudinal edge 210. The second coupling arrangement 230 is positioned along the second longitudinal edge 211 and extends along the length of the second longitudinal edge. In alternative embodiments the first and second coupling arrangements may extend a partial length along the first or second longitudinal edges respectively. In the illustrated embodiment the first coupling arrangement 220 is a male coupler 221. In the illustrated embodiment of FIG. 2 the second coupling arrangement 230 is a female coupler 231. Details of the coupling arrangements will be described with respect to FIGS. 5a and 5b.

Figure 3:
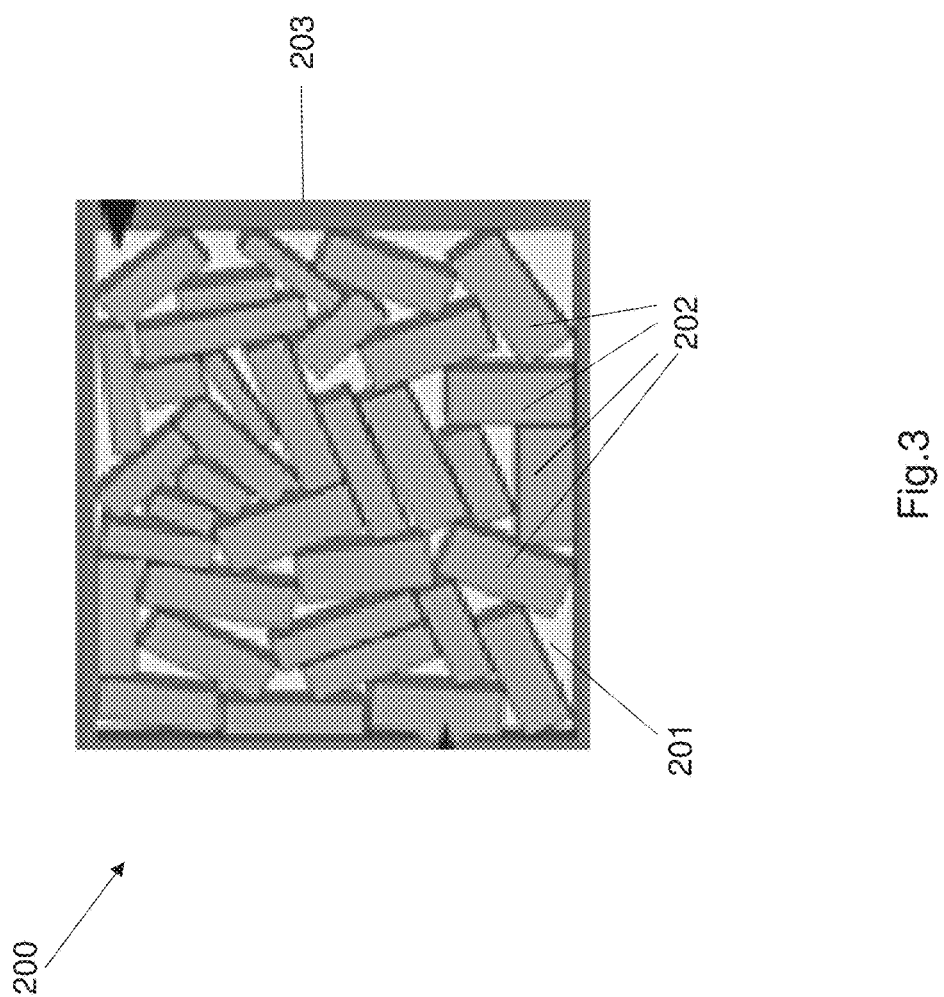
FIG. 3 shows an embodiment of the cross section of the composite material panel.

FIG. 3 shows a cross section of the composite material panel from FIG. 2. In the illustrated embodiment the substrate 201 comprises polyethylene. The substrate 201 forms a matrix that retains the strands 202 in use, and once the panel 200 is formed.

The strands 202 are elongate in shape and have a rectangular cross section in the illustrated embodiment of FIG. 3. In the illustrated embodiment of FIG. 3 the strands 202 are arranged in a random distribution within the substrate 201. The strands 202 are spaced from each other. The spacing between the strands 202 varies and is random in the illustrated embodiment. In alternative embodiments the strands 202 can be arranged parallel to each other and equally spaced from each other. The strands 202 are arranged in a longitudinal direction such that the longitudinal axis of the strands 202 aligns with the longitudinal axis of the panel 200 i.e. the strands 202 are arranged lengthwise along the substrate 201 and panel 200. In an alternative embodiment two or more strands 202 can be arranged as strand bundles. In strand bundles two or more strands are positioned adjacent each other or are joined together to form a bundle. The panel can comprise a plurality of strand bundles arranged within the substrate 201.

The strands 202 are of differing sizes relative to each other. In the illustrated embodiment of FIG. 3, the strands 202 are of random sizes. The strands 202 are held within the substrate 201. The thermoplastic material of the substrate 201 hardens to form a matrix to house the strands within the substrate 201. One exemplary size of the strands 202 is 2 cm wide, 2 cm thick and 5 cm long. Alternatively the strands could be 2 cm wide, 2 cm thick and 10 cm long. Further alternative sizes and dimensions of strands 202 are also contemplated. The dimensions of the strands 202 can be chosen to conform to best match the size of the panel that is being formed.

The panel 200 comprises an outer layer 203 that encases the substrate 201 and the strands 202. The outer layer allows the substrate 201 and strands 202 to hold shape. In the illustrated embodiment the outer layer is formed of PVC. The outer layer 203 may be for example overmoulded onto the formed substrate 201 with interspersed strands 202.

Figure 4A:
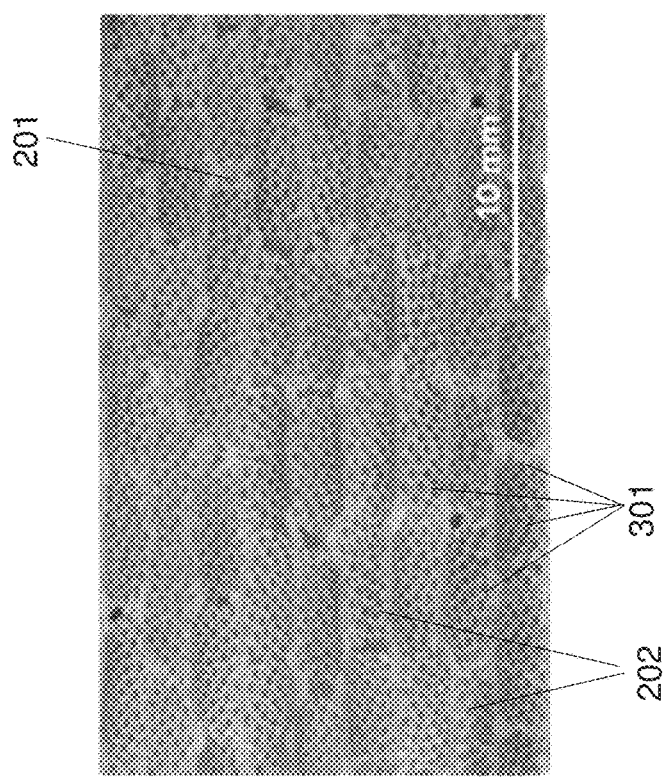
FIG. 4a shows a more detailed cross section of the panel.

FIG. 4a shows a more detailed cross section of the panel 200. FIG. 4a shows the structural details of the strands 202. As can be seen in FIG. 4a, the strands 202 each comprise a plurality of fibres 301 that extend the length of the strands 202. The fibres 301 are elongate in shape. Each bamboo strand 202 comprises a plurality of fibres 301 in a longitudinal direction. The fibres 301 are arranged within each strand 202 and form part of the strand 202. Each strand 202 can also comprise a plurality of hollow pockets. In one example the fibres 301 are positioned within the hollow pockets. FIG. 4a also shows the lighter coloured portions being the substrate 201.

As described earlier in the illustrated embodiment the strands 202 are formed from bamboo. Bamboo comprises a cellular structure comprising a plurality of bamboo fibres. The fibres can be arranged in bundles to form fibre bundles. Bamboo further comprises parenchyma cells positioned toward the outer portion of a bamboo stem. The fibres comprise approximately 40% of the bulk volume of a bamboo stem. The strands 202 are cut from a bamboo culm i.e. a bamboo stem that comprises the fibres 301. The strands 202 are prepared or cut along the length of the culm. The strands 202 are cut from the outer part of the culm which comprises the highest amount of fibres 301. The fibre volume fraction reduces as along the thickness of the culm and the concentration of fibres is least near the centre of the culm. Therefore it is desirable to cut the strands from the outer portion of the culm to achieve maximum fibre concentration in the strands 202. In the illustrated example of FIG. 4a, each strand 202 comprises at least 250 fibres.

Figure 4B:
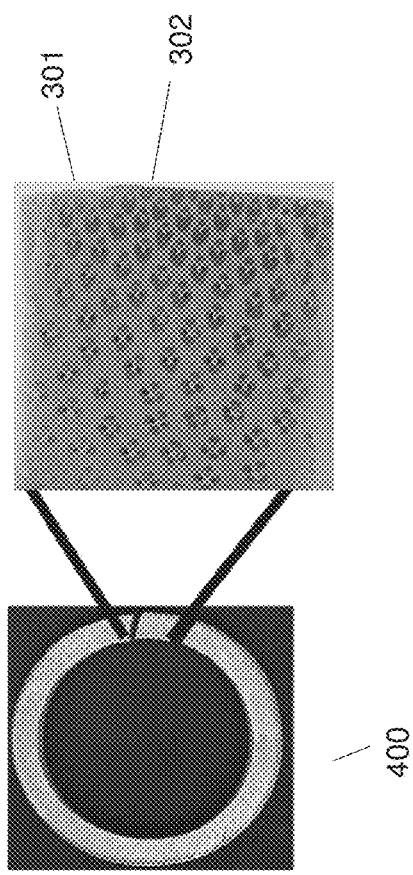
FIG. 4b shows a detailed view of the fibre distribution in a bamboo culm.

FIG. 4b shows a detailed view of the fibre distribution in a bamboo culm 400. As can be seen the fibres 301 are more tightly packed toward the outer portion or outer side of the culm 400. FIG. 4a shows a plurality of hollow pockets 302, with fibres positioned within the hollow pockets 302.

Figure 4C:
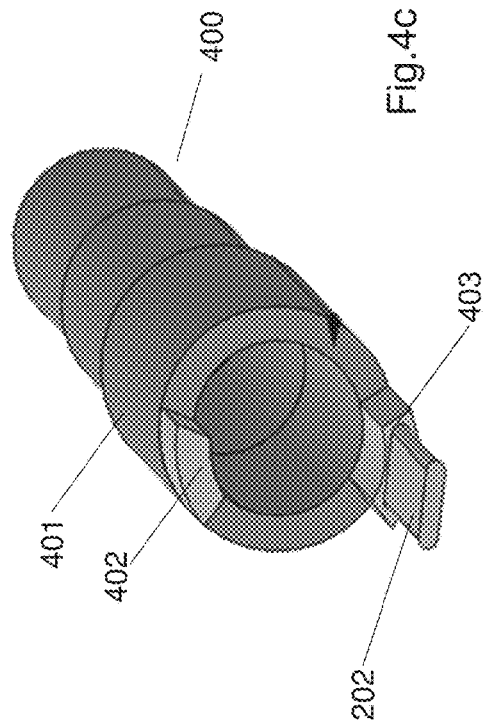
FIG. 4c shows an example of the bamboo strands being formed from a bamboo culm.

FIG. 4c shows an example of the bamboo strands 202 being formed from a bamboo culm 400. The strands 202 are formed from bamboo culms that are approximately 9.6 m in length with a diameter at breast height of 8 cm. FIG. 4c shows an exemplary form of the bamboo culm 400 used in formation of the strand 202. The strands 202 are formed by a cutting process. Preferably the strand 202 is cut from the middle section 403 of the ring 402 of the bamboo culm as shown in FIG. 4c. However, alternatively the strand 202 can be cut out of a portion of the culm adjacent an outer surface 401. The strands 202 are cut of the portion with high fibre volume fraction such that the strands 202 comprise a large number of bamboo fibres 301 or fibre bundles. Each fibre bundle is approximately 100 micrometers in width.

The bamboo culm 400 is split and then shredded into individual strands 202 using a suitable cutter such as a saw or a splitter tool. In some examples the strands 202 are formed by pushing the bamboo culm through a series of blades arranged to shred the culm at the middle section 403 of the ring 402. Other suitable cutting, shredding and bamboo processing techniques are also contemplated and can be used to form the strands 202. The cutting process is controlled to ensure that the strands 202 are all the same width. The cutting process applied also maintains the structure of the fibres 301.

Referring now to FIGS. 5a and 5b, an embodiment of the first and second coupling arrangements will be described. FIG. 5a shows a first embodiment of the first coupling arrangement 220 and the second coupling arrangement 230. The first coupling arrangement 220 and second coupling arrangement 230 are disposed on a single composite material panel 200. In order to create a modular wall system 100 a first composite panel 200a and a second composite panel 200b are coupled together via the first and second coupling arrangements on the first panel and second panel respectively. In the illustrated embodiment the first coupling arrangement 220 is shaped to be complementary to the second coupling arrangement 230. In creating a wall panel system 100 a first panel 200a is connected to the second panel 200b via the first and second coupling arrangements 220, 230. Specifically in this example the first coupling arrangement 220a of a first panel 200a removably connects to a second coupling arrangement 230b of a second panel 200b, since the first and second coupling arrangements 220, 230 are complementary to each other.

In the illustrated example of FIG. 5a the first panel 200a and second panel 200b are connected together via a tongue and groove joint. FIG. 5a shows an embodiment of the joint between the first panel 200a and the second panel 200b, the illustrated embodiment being a tongue and groove joint 501. Referring to FIG. 5a, the first coupling arrangement 220a of the first panel 200a is a male connector portion and the second coupling arrangement 230b of the second panel 200b is a female connector portion that interfaces with the male connector portion to connect to the first panel 200a to the second panel 200b. The coupling between the first and second panels 200a, 200b is a mechanical join that does not require any additional couplers or coupling devices. This is advantageous because the panels can be easily coupled and decoupled from each other providing for a modular wall panel system 100 by moving one panel relative to the other panel. Further the simple joint between the first and second panels is advantageous because there is no need for additional couplers or fasteners.

In the embodiment shown in FIG. 5a and FIG. 2 the first coupling arrangement 220 comprises a tongue 222 that protrudes outward from the first longitudinal edge 210. The tongue 222 form a male connector portion. The second coupling arrangement comprises a groove 232. The groove 232 is forms a female connector portion. The groove 232 is formed along the second longitudinal edge 211 and extends the length of the panel. The first panel and second connect together via a tongue and groove joint. The first panel 200a and second panel 200b are connected coupled together via a tongue and groove joint 501. The tongue and groove joint 501 are formed by joining the tongue 222 of the first panel 200a to the groove 232 of the second panel 200b. The first and second panel can be easily disconnected by pulling the tongue 222 out of the groove 232.

FIG. 5b shows an alternative embodiment of the coupling between a first panel 200a and second panel 200b. FIG. 5b also shows an alternative embodiment of the first coupling arrangement 220 and the second coupling arrangement 230. In the illustrated embodiment of 5b the first coupling arrangement 220 is present on a first panel 200a and the second coupling arrangement 230 is present on the second panel 200b. The first and second coupling arrangements are complementary to each other and join together to couple the first panel 200a to the second panel 200b. In the embodiment of 5b the coupling between the first panel 200a and the second panel 200b is a grooved joint 502.

As shown in FIG. 5b the first coupling arrangement 220 comprises a projection 520 that extends laterally from a first longitudinal edge 510. The projection 520 comprises a further ridge 521 extending downwardly from the projection 520. The projection 520 defines a shoulder 522 along the length of the panel 200. The second coupling arrangement 230 comprises an extension 530, which extends outwardly from the second longitudinal edge 511. The extension comprises a groove or trough 531 that extends the length of the extension 530. The extension comprises a lip 532 that extends outwardly and upwardly from the extension 530. The grooved joint (i.e. when the first and second panel are coupled) is formed by the ridge 521 engaging with the groove 531. The lip 532 assists to retain the ridge 521 within the groove 531. The first and second panel can be disconnected from each other by a simple lifting operation to disengage the ridge 521 from the groove 531.

The composite material panel 200 is formed using a hot pressing operation. The method of forming the composite material comprises providing a plurality of bamboo strands into a mould, providing a plurality of polymer material fibres, for example polyethylene fibres into the mould, and applying heat and pressure to the mould to form the composite material panel. The heat and pressure are applied via a hot pressing process.

Figure 6:
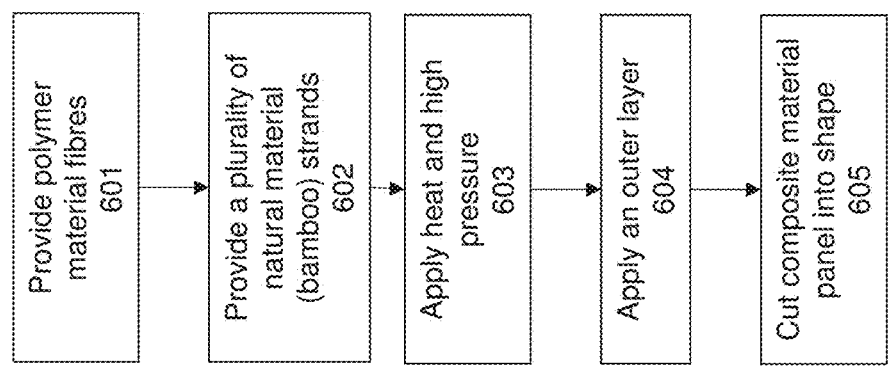
FIG. 6 shows a flow chart for an embodiment of a method for manufacturing the composite material panel.

FIG. 6 shows a flow chart for an embodiment of the manufacturing method that can be used to form the composite material panel 200. The method comprises, at step 601, providing polymer fibres into a mould. The polymer fibres are polyethylene fibres that are provided into a mould. Step 602 comprises providing bamboo strands 202 into the same mould as the polymer fibres. Step 603 comprises applying heat and pressure to the mould to form a composite structure of polyethylene substrate 201 with bamboo strands 202. The heat and pressure can be applied by a hot pressing process onto the mould. The heat causes the polymer fibres to melt and create a substrate to bind the bamboo strands 202 within the melted polymer material 201. Step 604 comprises applying an outer layer 203 of polyvinylchloride to the composite structure. The outer layer 203 is applied by an overmoulding process. Alternatively any other suitable moulding or application process can be used to create an outer layer 203 on the composite structure. Step 605 comprises cutting the composite structure into the required shape of a panel. In the illustrated embodiments the panel is in the shape of a rectangular prism. Alternatively the formed panel can be cut into any suitable shape. In some examples, these steps can be considered to be optimizing the mechanical properties of the composite material panel.

Figure 7:
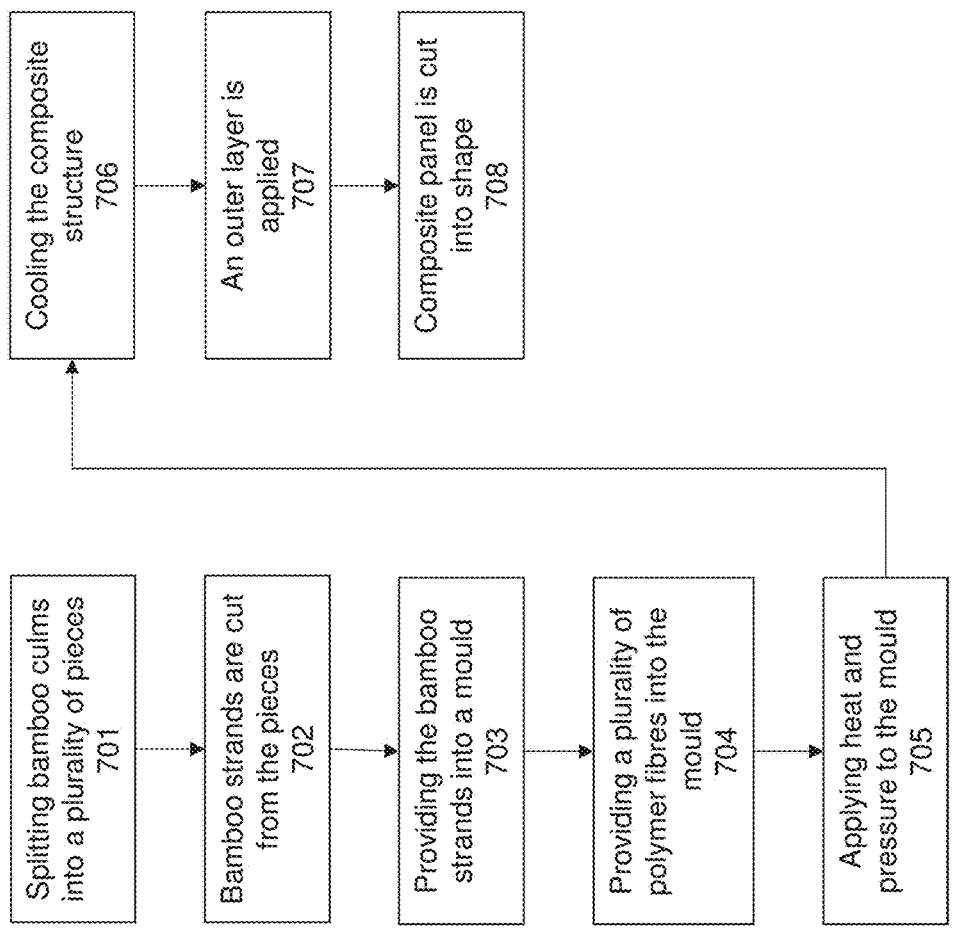
FIG. 7 shows a flow chart for an alternative embodiment of a method for manufacturing the composite material panel.

FIG. 7 illustrates a flow diagram for a further embodiment of the manufacturing method to form the composite material panel 200. The method described with reference to FIG. 7 can be used to form or manufacture the composite panel 200. The method comprises, at step 701, splitting bamboo branches or culms into a plurality of pieces. The bamboo culms are split using a splitting blade or a splitting machine. The bamboo culms are split longitudinally to create elongated pieces. At step 702 a plurality of bamboo strands 202 are cut from the split pieces of the culms. The bamboo strands are cut from a portion of the culm that comprises a maximum bamboo fibre distribution. In one example the bamboo strands 202 are cut from an outer portion of the culm. The strands 202 are cut into elongate shapes that possess a substantially rectangular cross section.

Step 703 comprises providing the plurality of bamboo strands 202 into a mould. The strands 202 are arranged in a longitudinal direction. The bamboo strands 202 are all arranged such that they are substantially parallel to each other along the longitudinal axes of the strands 202. In alternative embodiments the some bamboo strands 202 can be arranged in a longitudinal direction and some bamboo strands 202 can be arranged in a transverse direction i.e. some strands 202 are arranged perpendicular to other strands 202. In further alternative embodiments the bamboo strands 202 are arranged in a random composition.

Step 704 comprises providing a plurality of polymer material 201 fibres into the mould. The polymer material is polyethylene and generally comes as fibres or strands. The bamboo strands 202 and the polyethylene fibres are added into the same mould. The mould can be formed from any suitable metal suitable for moulding and pressing operations. In one example the mould is formed from stainless steel. The mould can also be any shape that is required for example a planar shape or rectangular prism in shape or cuboid in shape. Step 705 comprises applying heat and pressure to the mould via a hot pressing operation. The heat causes the polyethylene fibres to melt and spread through and around plurality of bamboo strands 202. The pressure causes the bamboo strands 202 to be compressed and intertwined with the liquid polyethylene. The pressure also causes the bamboo strands 202 causes the strands 202 to be more tightly packed. The pressure creates a laminate structure of polyethylene 201 and bamboo strands 202.

At step 706 the mould is cooled such that the liquid polyethylene sets and becomes substantially solid. The mould can be air cooled or can be cooled by submerging into a water bath or any other suitable cooling method. The polyethylene sets to create a substrate 201. As the polyethylene sets the bamboo strands 202 are retained within the substrate. The bamboo strands 202 become interspersed and locked within the polyethylene substrate 201 as the polyethylene sets. The substrate 201 of the polyethylene hardens as part of the cooling process. The hardening can take between 1 and 2 hours. However, longer cooling and hardening cycles can also be used. The cooling process applied is generally selected based on the thermoplastic material used as part of the substrate, since various thermoplastics have differing cooling times. For the current embodiment of polyethylene the hardening process takes between 1 and 2 hours. The substrate 201 with interspersed bamboo strands 202 can also further harden due to the pressure.

At step 707 an outer layer is added to the substrate 201 with the interspersed bamboo strands 202. The outer layer 203 is polyvinylchloride (PVC) and the outer layer encases the polyethylene substrate 201. The outer layer is added by an overmoulding operation. The PVC outer layer 203 is overmoulded onto the polyethylene substrate 201 comprising the entwined bamboo strands 202. At step 708 the moulded substrate 201 with bamboo strands 202 and PVC outer layer 203 are cut into a required shape to result in the composite material panel 200. As shown in the current figures the panel 200 is in the shape of a rectangular prism. Other shapes can be cut from the substrate 201.

The hot press process is a single step operation i.e. the heat and pressure are applied simultaneously. In alternative embodiments the hot press process can be a two stage process i.e. the heat is applied first and pressure is applied subsequently. The temperature range for the hot press process is between 350 degrees Celsius and 400 degrees Celsius. Other heat ranges are contemplated depending on the material used for the substrate 201. The range of 350 degrees to 400 degrees corresponds to a suitable temperature range to melt polyethylene such that it can be spread through and around the bamboo strands 202 with the mould. The pressure is applied on two sides of the mould and the substrate is pressed along the vertical axis of the mould i.e. the axis that is perpendicular to the longitudinal axis. The pressure applied is between 0.3 MPa to 1 MPa and the pressure is maintained for at least 3 minutes, but preferably the pressure is maintained for 4.5 minutes to 5 minutes.

Figure 8:
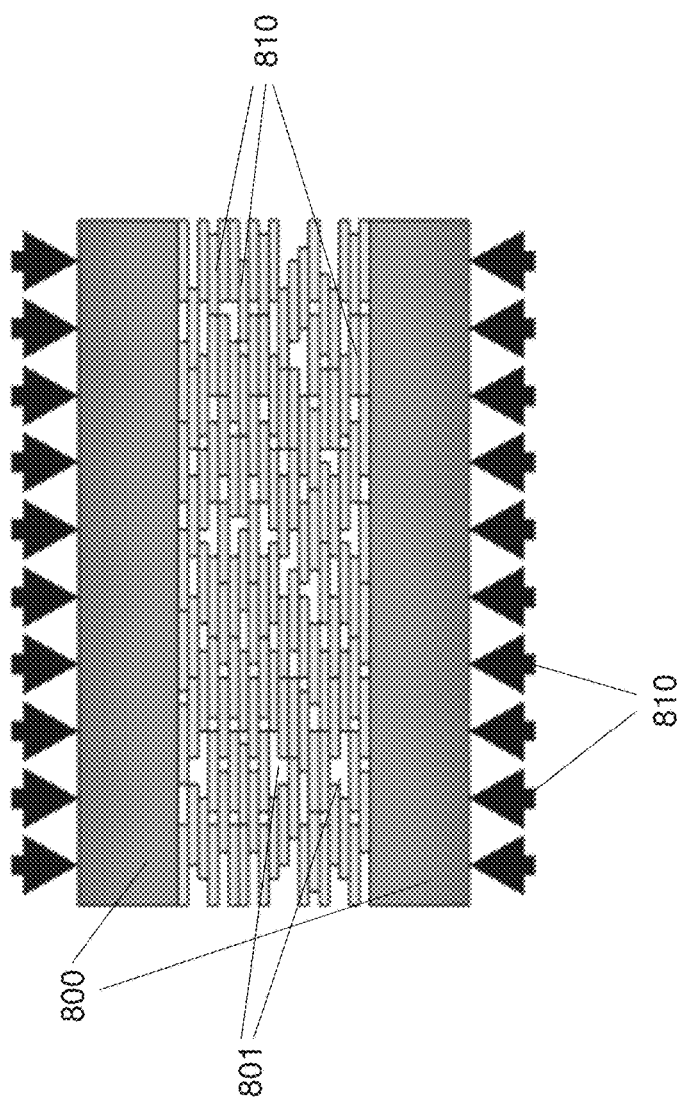
FIG. 8 shows a schematic view of a moulding operation that is used to manufacture the composite material panel.

FIG. 8 shows a schematic view of the moulding operation. FIG. 8 shows a schematic of the mould as well as the heat press process being applied to the mould. The schematic of FIG. 8 shows a mould 800 with a plurality of bamboo strands 202. The mould also includes a plurality of polyethylene fibres that will form the substrate to hold the bamboo strands 202. As can be seen the pressure 810 is denoted by the arrows and is applied along the vertical axis of the mould. The heat can be applied in the same direction or around all sides of the mould 800 using any suitable heating assembly such as a plurality of electrical coils to create an inductive heating assembly. The pressure can be applied by a mechanical press, hydraulic press or plunger mechanism that is causes pressure on the mould, and transferring the pressure to the substrate 201 and strands 202.

The composite material panel 200 as described is provides several advantages. The bamboo strands 202 being present in the substrate of 201 of polymer material improves the overall mechanical properties of the panel 200. The presence of the bamboo strands 202 improves the mechanical properties of the composite panel 200 as compared to using polymer material alone or bamboo alone. The bamboo strands 202 being interspersed through the polymer (i.e. polyethylene substrate) holds the bamboo strands 202 in an orderly pattern and assists in transferring loads among the strands 202 and between discontinuous strands 202. The bamboo strands 202 act as the main load bearing members within the substrate 201. The bamboo strands 202 being used in conjunction with a polymer substrate 201 provide improved being stability and bending resistance. The substrate 201 and the bamboo strands 202 are integrated and synergistically function to provide a harder, lighter, and more durable panel for use in modular wall systems.

The density of the composite panel 200, once it is completely formed, is approximately 1100 kg/m$^3$. The composite material panel 200 further comprises a hardness of at least 2800 lbf which is higher than the hardness of polyethylene and bamboo individually. This makes the composite panel harder than oak which makes the panel 200 more durable. The elastic modulus of the formed composite material panel 200 is approximately 22 GPa by nanoindentation and about 30 GPa by a micro-tensile testing. The individual elastic modulus of the polyethylene substrate and bamboo individually is about 0.8 GPa and 2 GPa approximately. Therefore the bamboo strands 202 being interspersed and locked within the polyethylene substrate 201 provides a substantially more stiff and harder panel as established by the significantly higher elastic module of the panel 200. The use of bamboo strands 202 is also advantageous because the overall weight of the panel 200 is reduced as compared to a panel formed from timber or polymer material only. Bamboo is hollow and therefore using bamboo strands 202 helps to reduce the overall weight of the panel while still providing stiffness along the longitudinal axis.

The use of natural materials is currently becoming more desirable for use in the construction industry. The construction industry especially the interior design industry is becoming more ecologically conscious and there is a need for products that reflect these values. The use of bamboo strands within the composite material panel reflects ecologically and environmentally friendly values. Bamboo is also a highly renewable resource and is able to grow to maturity in three to five years. Therefore the use of bamboo is environmentally friendly because bamboo is a renewable resource.

Bamboo has an appearance and a feel that is distinctive and unique. The use of bamboo in forming the panels, gives the panels a distinctive appearance and feel, which is considered elegant. The use of multiple composite material panels 200 in a wall panel system gives the wall panel system an elegant and unique look and feel. Bamboo is considered a sign of culture, particularly in East and South-East Asian countries like China, Japan and India. In China bamboo is a symbol of longevity. In Japan bamboo is a symbol of protection against evil and in India bamboo is considered a sign of friendship. The use of the composite wall panels in interior spaces such as office spaces, is culturally conscious and signifies a high quality product.

It will be appreciated by persons skilled in the art that numerous variations and/or modifications may be made to the invention as shown in the specific embodiments without departing from the spirit or scope of the disclosure as broadly described. The present embodiments are, therefore, to be considered in all respects as illustrative and not restrictive.

It is to be understood that, if any prior art information is referred to herein, such reference does not constitute an admission that the information forms a part of the common general knowledge in the art, in any other country.

The invention claimed is:

1. A composite material panel comprising:
a substrate formed of a first material,
one or more strands formed from a second material, the strands being interspersed through the substrate, the second material being a natural material,
the second material providing modified mechanical properties of the composite material panel;
wherein each strand comprises a plurality of fibres and a plurality of hollow pockets, each of the plurality of fibres being arranged longitudinally along the length of the strand and positioned within one of the plurality of hollow pockets.

2. A composite material in accordance with claim 1, wherein the strands are interspersed through the substrate and held within the substrate.

3. A composite material in accordance with claim 1, wherein the strands have a rectangular cross section and the strands are a rectangular prism shape.

4. A composite material in accordance with claim 1, wherein the strands are arranged parallel to each other within the substrate and wherein the strands are equally spaced apart from each other within the substrate.

5. A composite material in accordance with claim 1, wherein the strands are arranged parallel to the longitudinal axis of the panel.

6. A composite material in accordance with claim 1, wherein the strands are arranged in a random distribution within the substrate.

7. A composite material in accordance with claim 1, wherein the two or more strands are joined together to form a strand bundle and wherein the panel comprises a plurality of strand bundles interspersed through the substrate.

8. A composite material in accordance with claim 1, wherein the natural material is bamboo, and the strands are bamboo strands.

9. A composite material in accordance with claim 1, wherein the strands comprise up to 70% of the bulk volume of the composite material panel.

10. A composite material in accordance with claim 1, wherein the composite material panel comprises an outer layer arranged to encase the substrate and strands, the outer layer being formed of a third material, and wherein the third material is a thermoplastic polymer material.

11. A composite material in accordance with claim 10, wherein the strands are bamboo strands and the third material is polyvinylchloride (PVC), and a composite structure manufactured by hot press of the bamboo strands and PVC forms a strand woven bamboo (SWB) module.

12. A composite material in accordance with claim 1, wherein the composite material panel is substantially rectangular in cross section, and is a rectangular prism in shape.

13. A composite material in accordance with claim 1, wherein the composite material panel comprises a first and second longitudinal edge, the first and second longitudinal edges being parallel to each other, the panel comprising a first coupling arrangement positioned on the first longitudinal edge and a second coupling arrangement positioned on the second longitudinal edge.

14. A composite material in accordance with claim 13, wherein the first and second coupling arrangements are one half of a mechanical joint, the first and second coupling arrangements being shaped and configured to interface with a corresponding coupling arrangement of a second panel to join the composite material panel to another panel.

15. A composite material in accordance with claim 14, wherein the first coupling arrangement is a male portion of the mechanical joint and the second coupling arrangement is a female portion of a mechanical joint, the first coupling arrangement configured to mate with a corresponding female portion of a mechanical joint and the second coupling arrangement configured to receive a corresponding male portion of a mechanical joint and wherein the mechanical joint.

16. A composite material in accordance with claim 15, wherein the mechanical joint is a tongue and groove joint or a grooved joint.

17. A composite material in accordance with claim 1, wherein the composite material panel comprises a density of at least 1100 kg/m$^3$, a hardness of at least 2800 lbf and an elastic modulus of at least 22 GPa.

18. A wall system comprising:
a first panel, a second panel,
the first and second panels arranged to removably couple to each other such that the wall system is a modular arrangement,
and wherein each panel comprises a substrate formed of a first material and a plurality of elongate strands of a natural material being interspersed through the substrate;
wherein each elongate strand comprises a plurality of fibres and a plurality of hollow pockets, each of the plurality of fibres being arranged longitudinally along the length of the elongate strand and positioned within one of the plurality of hollow pockets.

19. A wall system in accordance with claim 18, wherein the first panel comprises a coupling arrangement on a longitudinal edge, the second panel comprises a coupling arrangement on a longitudinal edge, the coupling arrangement on each of the first panel and second panel being complementary to each other such that the first panel can be removably coupled to the second panel.

20. A wall system in accordance with claim 18, wherein the first panel and second panel are a composite material panel.

* * * * *